United States Patent
Hansen

(10) Patent No.: US 9,545,773 B2
(45) Date of Patent: *Jan. 17, 2017

(54) PAD COMPRISING AN EXTRUDED MESH AND METHOD OF MAKING THEREOF

(71) Applicant: Albany International Corp., Rochester, NH (US)

(72) Inventor: Robert A. Hansen, North Muskegon, MI (US)

(73) Assignee: Albany International Corp., Rochester, NH (US)

(*) Notice: Subject to any disclaimer, the term of this patent is extended or adjusted under 35 U.S.C. 154(b) by 369 days.

This patent is subject to a terminal disclaimer.

(21) Appl. No.: 13/834,828

(22) Filed: Mar. 15, 2013

(65) Prior Publication Data

US 2014/0272270 A1 Sep. 18, 2014

(51) Int. Cl.
*B32B 5/12* (2006.01)
*B32B 5/02* (2006.01)
(Continued)

(52) U.S. Cl.
CPC .............. *B32B 5/12* (2013.01); *A43B 3/0026* (2013.01); *A43B 7/32* (2013.01); *A43B 13/188* (2013.01); *B29C 47/0047* (2013.01); *B29D 28/005* (2013.01); *B32B 5/028* (2013.01); *B32B 5/26* (2013.01); *B32B 25/10* (2013.01); *D04H 3/005* (2013.01); *B29C 47/003* (2013.01); *B29C 47/0014* (2013.01); *B29C 47/0019* (2013.01); *B29C 47/0021* (2013.01); *B29C 47/0033* (2013.01); *B29C 47/065* (2013.01); *B29C 2793/0018* (2013.01); *B29K 2075/00* (2013.01); *B29K 2077/00* (2013.01); *B29K 2105/04* (2013.01); *B29K 2995/0044* (2013.01); *B29K 2995/0046* (2013.01); *B29K 2995/0091* (2013.01); *B29L 2009/00* (2013.01); *B29L 2028/00* (2013.01); *B29L 2031/3017* (2013.01); *B29L 2031/50* (2013.01);
(Continued)

(58) Field of Classification Search
CPC ............ Y10T 428/24124; D21F 1/0036; D21F 1/0063; D21F 3/0227
USPC ........................................................ 428/113
See application file for complete search history.

(56) References Cited

U.S. PATENT DOCUMENTS

RE21,890 E 8/1941 Walsh et al.
2,581,790 A 1/1952 Gates
(Continued)

FOREIGN PATENT DOCUMENTS

GB 2 197 886 A 6/1988
WO WO 2004/072368 A 8/2004
(Continued)

OTHER PUBLICATIONS

International Search Report and Written Opinion issued by the European Patent Office for corresponding international application PCT/US2014/023265 mailed Aug. 27, 2014.

*Primary Examiner* — Brent O'Hern
(74) *Attorney, Agent, or Firm* — McCarter & English

(57) ABSTRACT

A structure for use in a compressible resilient pad. The structure contains both axially elastomeric strands and relatively inelastic strands co-extruded in various patterns. The structure has a high degree of both compressibility under an applied normal load and excellent recovery (resiliency or spring back) upon removal of that load.

28 Claims, 7 Drawing Sheets

(51) Int. Cl.
  *D04H 3/005* (2012.01)
  *B32B 25/10* (2006.01)
  *B29D 28/00* (2006.01)
  *A43B 3/00* (2006.01)
  *A43B 7/32* (2006.01)
  *A43B 13/18* (2006.01)
  *B32B 5/26* (2006.01)
  *B29L 31/00* (2006.01)
  *B29L 31/50* (2006.01)
  *B29L 28/00* (2006.01)
  *B29L 31/30* (2006.01)
  *B29C 47/00* (2006.01)
  *B29C 47/06* (2006.01)
  *B29K 75/00* (2006.01)
  *B29K 77/00* (2006.01)
  *B29K 105/04* (2006.01)
  *B32B 37/15* (2006.01)
  *B29L 9/00* (2006.01)

(52) U.S. Cl.
  CPC ... *B29L 2031/504* (2013.01); *B29L 2031/732* (2013.01); *B32B 37/153* (2013.01); *B32B 2471/00* (2013.01); *Y10T 428/24099* (2015.01); *Y10T 428/24107* (2015.01)

(56) References Cited

U.S. PATENT DOCUMENTS

| | | | |
|---|---|---|---|
| 3,059,312 A | 10/1962 | Jamieson | |
| 3,086,276 A | 4/1963 | Bartz et al. | |
| 3,664,905 A | 5/1972 | Schuster | |
| 3,791,784 A | 2/1974 | Arechavaleta | |
| 3,920,511 A | 11/1975 | Grieves et al. | |
| 3,928,699 A | 12/1975 | Fekete | |
| 4,107,371 A | 8/1978 | Dean | |
| 4,241,123 A | 12/1980 | Shih | |
| 4,350,731 A | 9/1982 | Siracusano | |
| 4,351,872 A | 9/1982 | Brosseau et al. | |
| 4,356,225 A | 10/1982 | Dufour | |
| 4,427,734 A | 1/1984 | Johnson | |
| 4,460,633 A | 7/1984 | Kobayashi et al. | |
| 4,469,739 A | 9/1984 | Gretzinger et al. | |
| 4,529,643 A | 7/1985 | Lundstrom | |
| 4,555,440 A | 11/1985 | Crook | |
| 4,565,735 A | 1/1986 | Murka, Jr. et al. | |
| 4,636,419 A | 1/1987 | Madsen et al. | |
| 4,673,015 A | 6/1987 | Andreasson | |
| 4,728,565 A | 3/1988 | Fontana | |
| 4,781,967 A | 11/1988 | Legge et al. | |
| 4,798,760 A | 1/1989 | Diaz-Kotti | |
| 4,830,915 A | 5/1989 | Diaz-Kotti | |
| 4,980,227 A | 12/1990 | Sekiguchi et al. | |
| 5,360,656 A | 11/1994 | Rexfelt et al. | |
| 6,240,608 B1 | 6/2001 | Paquin et al. | |
| 6,391,420 B1 | 5/2002 | Cederblad et al. | |
| 2003/0124310 A1 | 7/2003 | Ellis et al. | |
| 2007/0163741 A1 | 7/2007 | Crook | |
| 2007/0194490 A1 | 8/2007 | Bhatnagar et al. | |
| 2007/0202314 A1 | 8/2007 | Youn et al. | |
| 2009/0047855 A1 | 2/2009 | Seth et al. | |
| 2010/0129597 A1* | 5/2010 | Hansen et al. | 428/107 |
| 2010/0262107 A1 | 10/2010 | Turner et al. | |
| 2012/0189806 A1* | 7/2012 | Hansen et al. | 428/134 |
| 2014/0272269 A1* | 9/2014 | Hansen | 428/111 |
| 2014/0272270 A1* | 9/2014 | Hansen | 428/111 |

FOREIGN PATENT DOCUMENTS

| | | |
|---|---|---|
| WO | WO 2007/067949 A | 6/2007 |
| WO | WO 2009/086533 A | 7/2009 |
| WO | WO 2010/141319 A | 12/2010 |
| WO | WO 2012/100161 A | 7/2012 |
| WO | WO 2012/100166 A | 7/2012 |

* cited by examiner

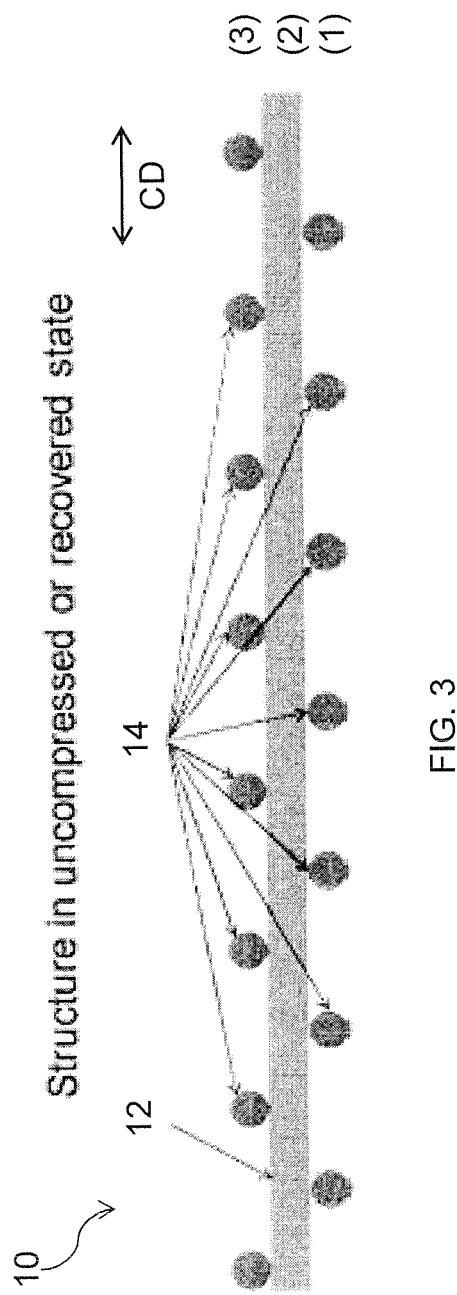
FIG. 3 Structure in uncompressed or recovered state
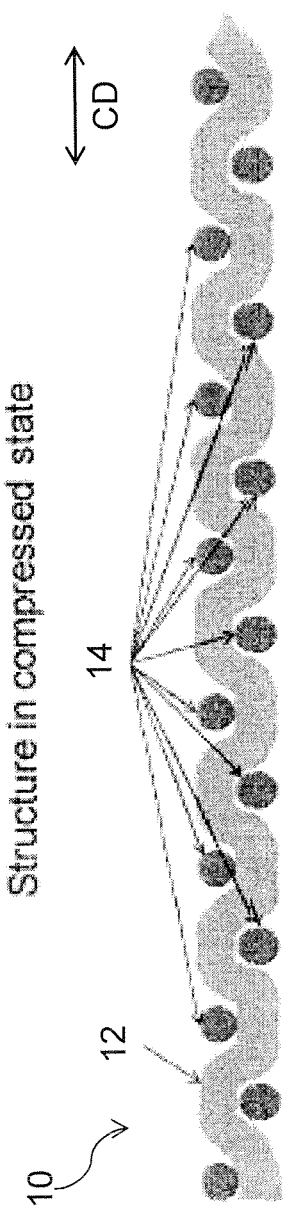
FIG. 4 Structure in compressed state

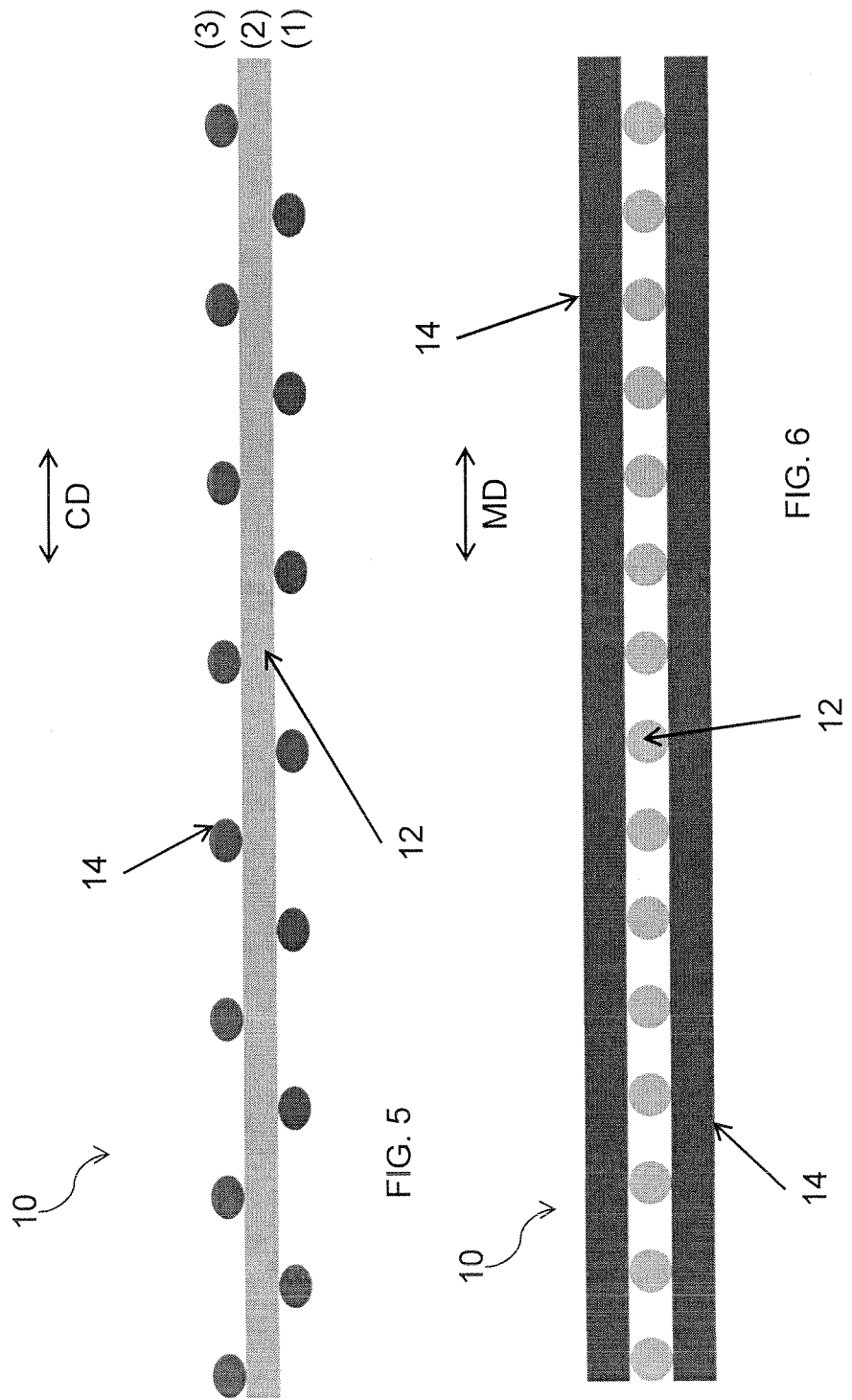

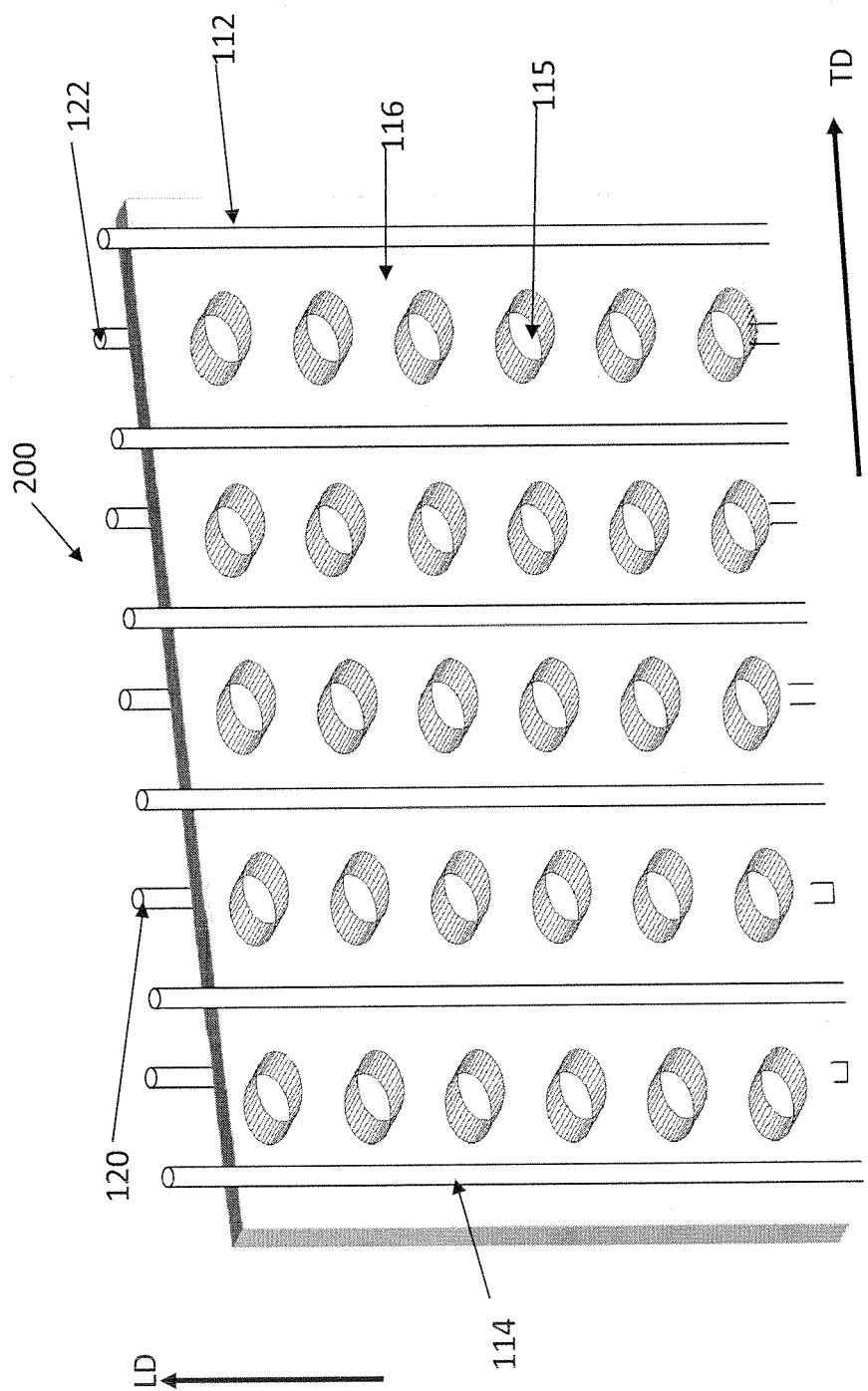

PAD COMPRISING AN EXTRUDED MESH AND METHOD OF MAKING THEREOF

BACKGROUND OF THE INVENTION

Field of the Invention

The present invention relates to a compressible/resilient structure for various uses such as, for example, in athletic shoes, regular shoes, boots, floor carpets, carpet pads, sports floors etc. The structure itself can be the final product or the structure can be a component of another structure. Uses envisioned include, but are not limited to: automobile parts and other composites; flooring; subfloors especially in gymnasiums or other sports arenas; press pads; ballistic cloth such as body armor or hurricane window protection; sporting equipment padding such as baseball catcher chest protectors; knee/elbow pads for runners, racers, skaters, volleyball players; cricket shin/knee pads; football hip pads; wall padding in stadiums, gymnasiums, arenas; shoe inserts (orthotics); heels/soles for athletic shoes e.g. running shoes; cushioning layer for bedding, vehicle seats, pillows; and other end uses where through thickness compressibility and resiliency is required.

Description of Prior Art

In related art, U.S. Pat. No. 6,391,420 discloses an extruded bicomponent elastomeric netting having unidirectional elasticity. The structure disclosed in the '420 patent is a nonwoven article employing an inelastic material such as polypropylene in one direction and an elastic material such as a styrene block copolymer in the other direction.

U.S. Patent Application No. 2007/0202314, PCT Application No. WO 2007/067949 and U.S. Patent Application No. 2007/0194490 are examples where "crossless" structures are used as the substrate. Substitution of the structure according to the present invention for at least some of these layers allows through thickness compression and spring back, and results in an improved overall structure.

The inventive structure can also be used as shoe inserts or orthotic inserts, which are usually molded solid resin. Incorporation of a layer of the structure according to the present invention improves the cushioning effect thereof. For soles/heels for sports shoes, which are usually solid viscoelastomeric materials, some attempts to improve "cushioning" have been to mold in for example "air channels or pockets." However, the rigidity of the molded material is such that cushioning effects are limited. Incorporation of the structure according to the present invention as a layer in the cast structure, free of "resin" to allow movement, substantially improves the cushioning effect of running/athletic shoes. And if the "resin" is a polyurethane foam or silicone foam, then it can impregnate or even encapsulate the mesh structure.

Therefore, it would be an advancement in the state of the "pad-making" art to provide a pad that provides excellent elastic behavior under load with high through thickness recovery.

SUMMARY OF THE INVENTION

The present invention is a 'shock-absorbing pad' that utilizes a unique structure which provides excellent elastic behavior under a load applied normal to the surface of the structure with high through thickness compressibility and recovery (resiliency). The instant structure utilizes an elastic component in at least one direction, which allows the entire structure to 'collapse' into itself under an applied normal load (i.e. pressure) based primarily upon the elasticity of this component and the structure geometry to conform under pressure and to "spring back" when the load (pressure) is removed, thus allowing this unique behavior.

An object of the invention is to provide a structure that has improved recovery characteristics over memory foams, gels, spring systems, etc.

Another object of the invention is to form a smooth and uniform surface over the pad in order to improve support, for example, the shoe and the foot.

Yet another object of the invention is to form a 'planar,' structure of strands with improved support of the carpet/sport floor/floor material.

Yet another object of the invention is to provide excellent retention of the recovery/dampening characteristics by utilizing the elastic component's 'full' recovery within the structure, as opposed to straight compression of materials. This is achieved due to the structure providing support between the sections of the elastic component, which avoids 'overstressing' the material, keeping it 'alive' and resulting in a longer useful lifetime.

Yet another object of the invention is to provide an excellent compression recovery versus weight ratio, allowing significant dampening capability with light weight structures.

Yet another object of the invention is to provide excellent 'breathability' of the shock absorbing structure, allowing perspiration and other moisture to evaporate and/or be removed during the compression phase.

For a better understanding of the invention, its operating advantages and specific objects attained by its uses, reference is made to the accompanying descriptive matter in which preferred, but non-limiting, embodiments of the invention are illustrated.

One embodiment of the invention is an ultra-resilient pad for use in sports shoe, running shoes, regular shoes, boots etc. Another embodiment is an ultra-resilient 'carpet pad' for use in floor carpets, sports floor, floor coverings etc.

Accordingly, disclosed is a compressible resilient pad, wherein the pad includes an extruded bicomponent elastomeric mesh or netting. The bicomponent mesh or netting may be produced by an extrusion die fed by two separate polymer streams. The bicomponent extruded mesh or netting is a structure comprising at least two layers of a relatively inelastic strand material in one direction and at least one layer of an elastic strand material that is co-extruded in the transverse direction. Any combination of materials to form the strand layers may be used, as long as the two types of materials are compatible from processing and rheological standpoints. For example, the strands of the two material streams should have good joint bond strength. The net or extruded mesh may comprise preferably a relatively inelastic material such as a polyamide in the longitudinal direction and an elastic material such as polyurethane in the transverse direction.

The strands or members/components in any layer can have, for example, a round or a non-round cross sectional shape including square, rectangular, elliptical or oval, triangular, star-shaped, grooved or any polygonal shape.

The final structure can include one or more woven layers with the inventive bicomponent extruded mesh attached thereto. One or more layers of batt, nonwoven material, for example spunbond or meltblown, longitudinal or transverse direction yarn arrays, or spiral link fabrics may also be attached to this structure by methods known to those skilled in the art.

Another embodiment of the present invention is a method of forming a bicomponent extruded mesh or netting including the steps of extruding at least two layers of a relatively inelastic strand material in one direction and co-extruding at least one layer of an elastic strand material in the transverse direction between the two layers of inelastic strands. The net or mesh can be produced preferably with a inelastic material such as a polyamide in one direction and an elastic material such as polyurethane in the other direction.

Another embodiment of the present invention is a compressible resilient bicomponent extruded mesh comprising one or more layers of an elastic extruded film or sheet, wherein the extruded film or sheet is elastic, resilient, and compressible in a thickness direction and extensible, bendable, and resilient in the length and transverse directions, and two or more layers of a relatively inelastic member/component co-extruded on either side (surface) of the extruded film or sheet.

Yet another embodiment of the present invention is a method of forming a compressible resilient bicomponent extruded mesh. The method includes extruding one or more layers of an elastic film or sheet, wherein the extruded film or sheet is elastic, resilient, and compressible in a thickness direction and resilient, extensible and bendable in the length and transverse directions, and co-extruding two or more layers of relatively inelastic members/components on top of and under the film or sheet surfaces. In the disclosure and the embodiments herein, the bicomponent extruded mesh or netting can be either a final product or the structure can be a component of another structure. The mesh structure can be included in a group of products including footwear; shoes; athletic shoes; boots; flooring; carpets; carpet pads; sports floors; automobile parts; composites; subfloors; gymnasium subfloors; sports arena subfloors; press pads; ballistic cloth; body armor; hurricane window protection; padding; sporting equipment padding; baseball catcher chest protectors; knee/elbow pads; hip pads; wall padding; shoe inserts and orthotics; heels/soles for athletic shoes; a cushioning layer for bedding, and vehicle seats.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF DRAWINGS

The accompanying drawings, which are included to provide a further understanding of the invention, are incorporated in and constitute a part of this specification. The drawings presented herein together with the description serve to explain the principles of the invention. In the drawings:

FIG. 3 is a schematic cross-sectional view of a bicomponent extruded mesh, according to one embodiment of the present invention;

FIG. 4 is a schematic cross-sectional view of a bicomponent extruded mesh, according to one embodiment of the present invention;

FIG. 5 is a schematic cross-sectional view of a bicomponent extruded mesh, according to one embodiment of the present invention;

FIG. 6 is a schematic cross-sectional view of a bicomponent extruded mesh, according to one embodiment of the present invention;

FIG. 9 is a profile view of a compressible bicomponent extruded mesh, according to one embodiment of the present invention.

DETAILED DESCRIPTION

For purposes of the present invention, the term "transverse direction" is synonymous and sometimes simply referred to as "TD", as is the term "longitudinal direction", sometimes simply referred to as "LD". However, the term "transverse" is sometimes also used to refer to strands/members/components which extend in a direction opposite to that of strands/members/components previously referred to. The meaning will be clear from the context in any particular instance.

The invention, according to one embodiment, is a 'shock-absorbing' pad that utilizes a unique structure which provides excellent elastic behavior under a normal pressure load with high thickness recovery (resiliency).

Figure 1B:
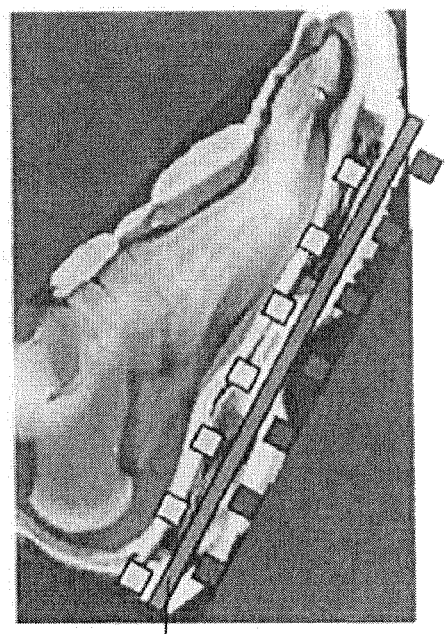
FIGS. 1(A) and 1(B) are applications of an ultra resilient pad, according to one embodiment of the present invention.
Figure 1A:
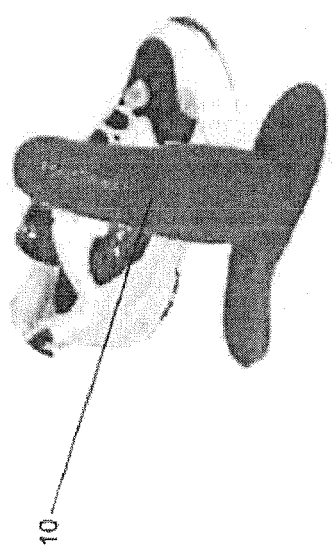
Figure 2:
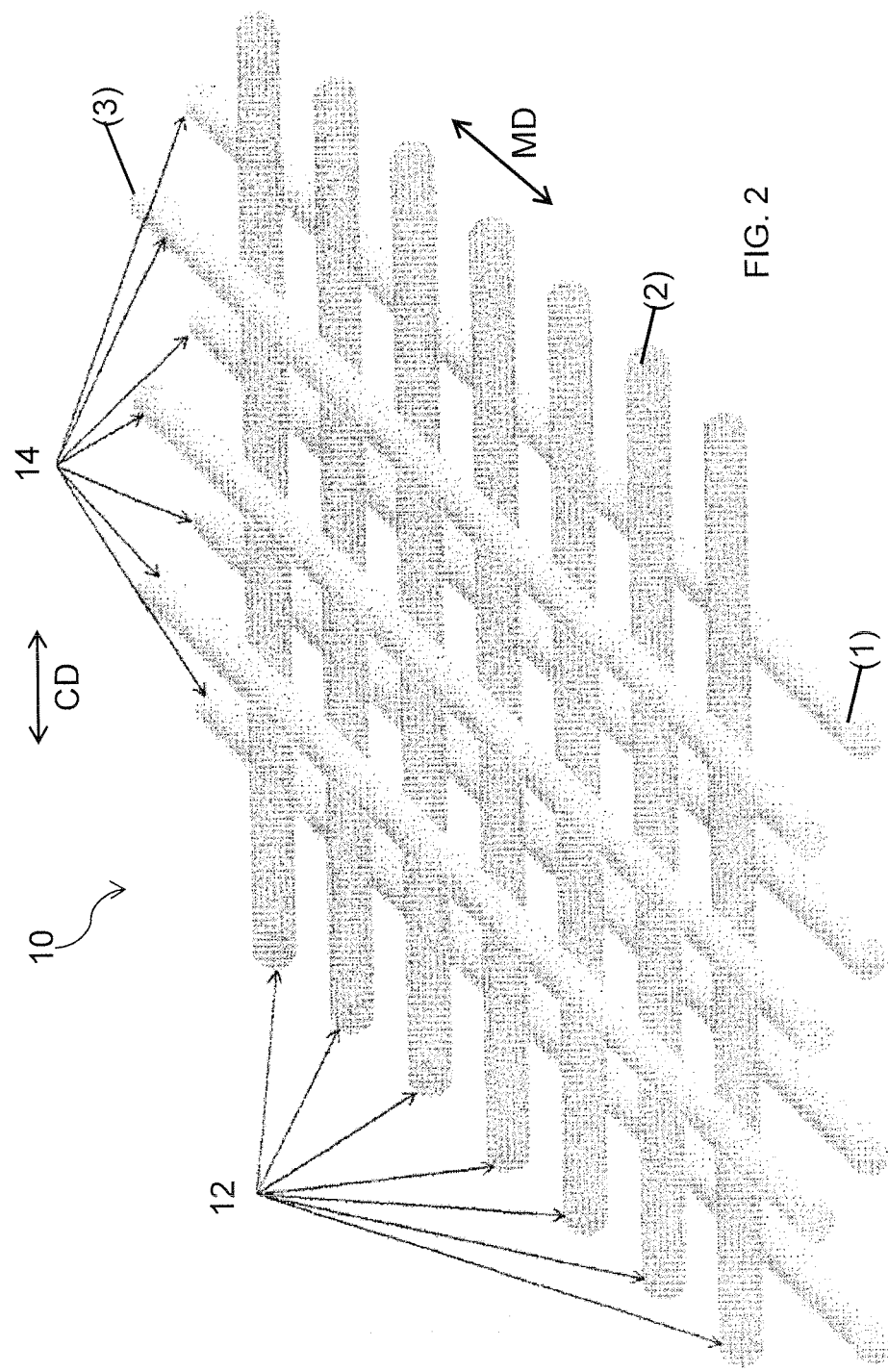
FIG. 2 is a schematic profile view of a bicomponent extruded mesh, according to one embodiment of the present invention.

One embodiment of the invention is shown in FIG. 2, which is a bicomponent extruded mesh 10 for use in shoes such as sports shoes, running shoes, regular shoes, boots etc. A bicomponent extruded mesh 10 for a shoe pad is shown in FIG. 2 as having a first or bottom layer (1) comprised of functional strands 14 extruded in a parallel array oriented in the longitudinal direction. A second or middle layer (2) of strands 12 is co-extruded orthogonal or at 90 degrees to the first layer (1). The strands 12 have the elastomeric features as aforesaid. A third or top layer (3) comprised of functional strands 14 is also co-extruded in the form of a parallel array orthogonal to layer (2). The strands 14 in layer (3) are positioned or aligned within the space between strands 14 in layer (1). Strands 14 in layers (1) and (3) are comprised of a relatively inelastic material. The strands in all layers are co-extruded polymeric elongate members which cross and intersect during extrusion to form the net-like structure shown in FIG. 2. The term "bicomponent" refers to the use of two different materials, one being a relatively inelastic material in one direction, and the other being an elastic material in the other direction. In one preferred embodiment, the inelastic material is polyamide and the elastic material is polyurethane. Members of all three layers can be of the same shape and size, or can be of different shapes and sizes.

Turning now to FIG. 3, in it is shown the bicomponent extruded mesh 10 in an uncompressed or relaxed or recovered state. Upon application of a compressive load normal to the surface of the bicomponent extruded mesh 10, the strands 12 will stretch allowing the strands 14 from layer (1) and (3) to move towards each other and to "nest" between each other in the same plane, as shown in FIG. 4. Upon release of the load, due to the elastic behavior of the strands 12, they will cause the strands 14 from layer (1) and (3) to move apart from each other or "spring back," returning the pad to its desired thickness and openness as shown initially in FIG. 3. Such a structure is therefore compressible and resilient up to at least an entire elastic strand thickness.

In another embodiment, strands 14 have the same position and relative orientation/spacing as above, but strands 12 are extruded and oriented at less than 90 degree angle to strands 14, preferably at a 45 degree angle.

According to one exemplary embodiment, there can be more than two layers of functional LD strands and more than one layer of TD strands. With three layers of LD strands and two layers of TD strands in between, two of the three LD strand layers, for example, must be spaced apart relative to each other to allow nesting. For example, top and middle LD layers can be oriented such that strands in the middle layer fit in the space between two adjacent strands of the top LD, and strands in the bottom LD layer are stacked in vertical orientation with either the top or middle LD layers. Furthermore, the two layers of TD strands can be elastomeric, or only one layer can be and the other layer can be a functional strand layer to provide a greater degree of void volume, for example, under compressive load.

Also the degree of compression/resiliency is controlled by the elasticity of the required strands, size and number of strands, number of layers of the strands, and of course the totality of the structure itself. The inventive structure can also be part of a laminate with other strand arrays (MD and/or CD) or woven fabrics attached thereto.

The invention, according to one embodiment, is a method of forming a bicomponent extruded mesh or netting structure 10, as shown in FIGS. 2-6. Structure 10 is a fully extruded three layer bicomponent netting 10 that has excellent compressive and recovery properties. As shown in FIG. 2, the hard or stiff inelastic material 14 occupies upper layer (3) and lower layer (1) in a staggered fashion, and the elastomeric material 12 occupies the middle layer (2). The upper and middle layers (3, 2) are bonded to each other as are the middle and lower layers (2, 1) due to the extrusion process. The mesh structure can be extruded in the form of a cylinder or tube, which is then cut lengthwise and flattened to form a continuous sheet. The relatively inelastic strands (LD) may optionally be oriented (similar to monofilament yarn processing to improve tensile properties, for example) in a second processing step by exposing the mesh structure to LD stress.

Preferably, the elastomeric 12 and hard (incompressible and inelastic) strands 14 are orthogonal to each other, but this is not required. It should be noted that when this structure is uncompressed in the through thickness direction, that structure appears as shown in FIG. 3 where strands 12 in middle layer (2) appear in their straight or uncompressed state, and strands 14 lie on either side of the middle layer (2). However, when this structure is compressed due to an applied normal load to the structure's surface in the through thickness direction, that structure appears as shown in FIG. 4 where strands 12 in middle layer (2) conform themselves to the circumference of strands 14 in layers (1) and (3) so that strands 14 of layer (1) nest between immediately adjacent yarns 14 from layer (3). One advantage of forming a three layer extruded bicomponent netting product is the low cost to produce this material in comparison to conventional woven textile structures or independently bonded yarn arrays.

Note the hard (or relatively inelastic) strand 14 diameter, or sizes if nonround, can be equal to the elastomeric strand 12 diameter or sizes. However, the hard strand diameter or size may, in some instances, be greater than the elastomeric strand diameter or size, or vice versa. The diameters of round strands can range from 0.1 mm to 150 mm; however the preferred range is 0.2 mm to 70 mm.

Note strand systems (1) and (3) can be the same as each other or they can be different in terms of material, form, shape, etc. It is only required that the strands in layer (3) are spaced to fit between adjacent strands of layer (I) or vice versa. Strand shapes can include square, rectangular, elliptical or oval, triangular, star-shaped, grooved or any polygonal shape, and the dimension of the longest axis can be up to at least 250 mm.

Also note there does not have to be a one to one relationship between the number of strands of layers (1) and (3), but the number of strands in layer (3) can be only a fraction of the number of strands in layer (1) or vice versa. For example, layer (3) may contain only half the strands of layer (1) so that there are spaces between the strands of layer (3) in use, creating additional void volume. Strand spacing (from center to center) can be equal for both LD (hard) and TD (elastomeric) strands. However, the strand spacing may be varied based on the desired air or water permeability, open area, and void volume of the end structure. Maximum strand density can be based upon strand spacing being equal to two times the strand diameter, and minimum strand density can be based upon strand spacing being equal to three or more times the strand diameter. A bicomponent extruded mesh 10 with spacing being equal to three times the strand diameter is shown in FIGS. 5-6, for example.

Several materials can be used as the elastomeric strand material 17 which occupies the middle layer (2) of the three layer bicomponent extruded mesh. Examples include styrene block copolymer, elastomeric copolyesters, elastomeric copolyamides, elastomeric polyolefins and thermoplastic polyurethanes. Similarly, several materials can be used as the hard or inelastic strand material 14. Examples include polypropylene, polyethylene, polybutene, polyesters, polyamides, hard polyurethanes, and copolymers of such resins. Whatever materials are selected for the elastomeric and hard strands, these materials must be bonded together as a result of the extrusion process. One knowledgeable in polymeric materials knows that polymers can be formulated with additives to promote bonding between two different polymers. Clearly, forming bonds during the extrusion of the netting is required so selection of appropriate materials is paramount.

A high bond strength for the nodes (where the LD and TD strands cross and contact each other) of the strands is required. It is especially important if the extruded netting or mesh is oriented (like in monofilament extrusion processing) in a second processing step. In this process step, high forces are transferred and distributed through the netting joints/nodes to and from netting strands in all directions. Without a good strand to strand bond at the joint/node, the product will tear apart and fail.

Advantages of the bicomponent elastomeric mesh of the present invention over all-elastomeric netting are many. For instance, the product may be designed with one set of properties in one direction, and another set of properties in the opposite direction. Specifically, high yield strength and dimensional stability can be designed by using a relatively inelastic polymer such as polypropylene in one direction, while the elastomeric (compression and recovery) properties of the mesh/netting are ensured by the use of a good elastomeric material in the opposite direction.

According to one embodiment, the inventive structure can be 'shock-absorbing' pad that utilizes a unique structure which provides excellent elastic behavior under a normal pressure load with high caliper or thickness in the through direction (normal to the structure plane) recovery. This structure 100, shown in FIG. 8, utilizes an elastic media 116 which is co-extruded along with the relatively inelastic strands 122, 114. This configuration allows the entire structure to 'collapse' into itself (compress), based upon the elasticity of this media 116 and the structure to conform under pressure (an applied load normal to the surface of the structure), and then recover to substantially the same original form and thickness after removal of the pressure, thus presenting a unique repeatable behavior. The term "bicomponent" in this instance refers to the use of two different materials, one being a relatively inelastic material in one direction, and the other being an elastic material (i.e. the elastic media 116) in the other direction. The structure 100 includes one or more layers of an elastic extruded film or sheet, wherein the extruded film or sheet is elastic, resilient, and compressible in a thickness direction and extensible, bendable, and resilient in the length and transverse directions, and one or more layers of a plurality of substantially parallel functional longitudinal strands co-extruded on the top and bottom surfaces of the extruded film or sheet.

Figure 8:
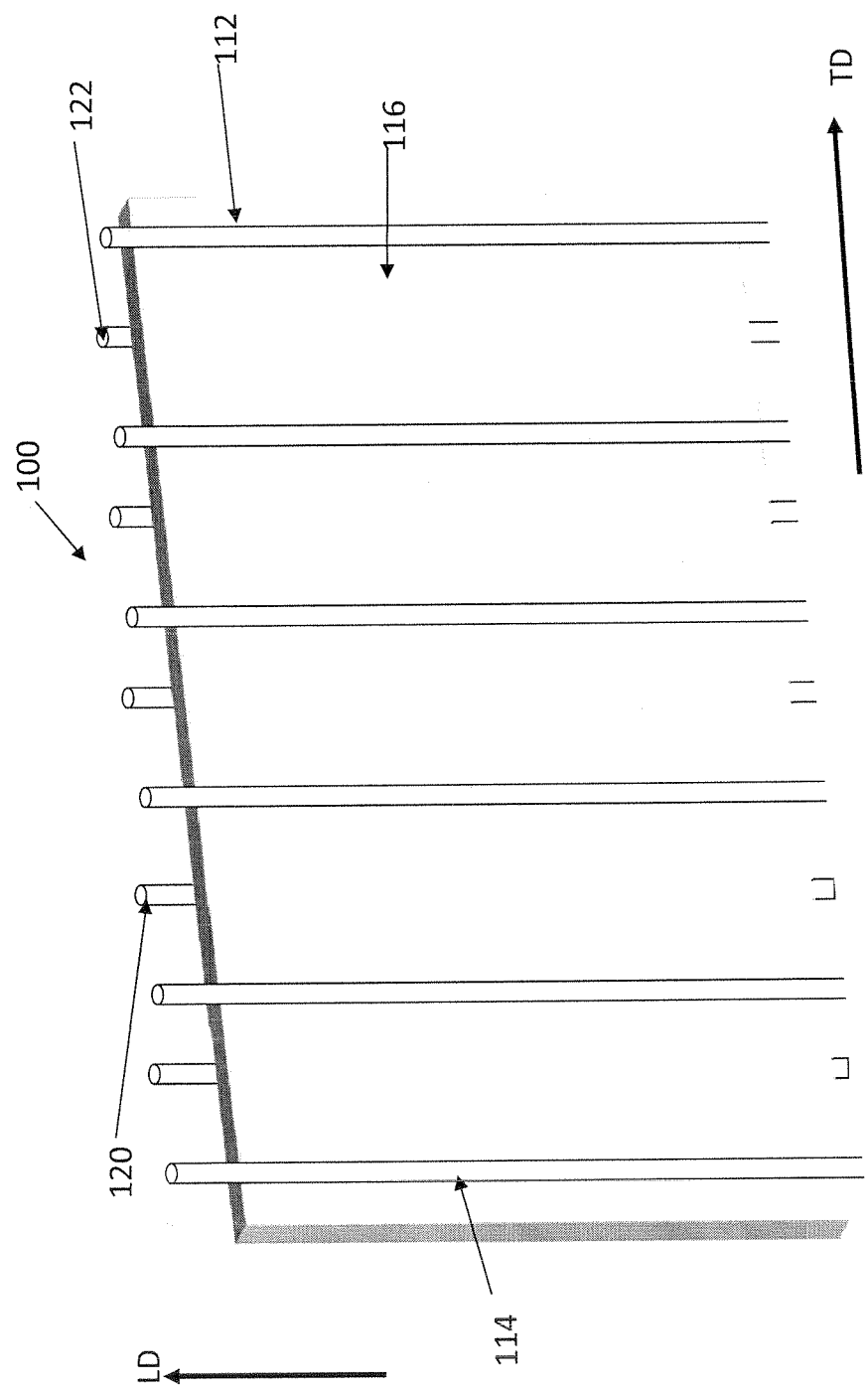
FIG. 8 is a profile view of a compressible bicomponent extruded mesh, according to one embodiment of the present invention.

A schematic of a compressible resilient bicomponent extruded mesh formed according to this exemplary embodiment is shown in FIG. 8. As shown, bicomponent extruded mesh 100 has a first or top (1) layer 112 comprised of relatively inelastic, hard functional strands 114 in a parallel array oriented in the longitudinal direction, a second or middle (2) layer 116 of an extruded film or sheet 116 having the elastic features as aforesaid, and a third or bottom (3) layer 120 comprised of relatively inelastic, hard functional strands 122 is co-extruded in the form of a parallel array on the other side (surface) of layer 116. All three layers may be co-extruded together as one single structure, or alternatively, the top, middle, and bottom layers can be extruded sequentially and attached to each other. Strands 122 in layer 120 are positioned or aligned within the spaces between adjacent strands 114 in top (1) layer 112 as described above. The film or sheet 116 can have a thickness of 0.10 to at least 50 mm, although films or sheets having a thickness from 0.5 mm to 25 mm are preferred.

An elastic extruded film or sheet that is defined as elastic, resilient, and compressible in its thickness direction and extensible, bendable, and resilient in its length and transverse directions is required for this embodiment. The elastic extruded film or sheet can optionally be perforated, as shown in FIG. 9, for example, so as to have a plurality of through holes or voids 115 distributed in a predetermined symmetric pattern or in a random asymmetric pattern. The elastic extruded film or sheet can be composed of any elastic material, such as thermoplastic polyurethane (TPU). Examples of good elastic materials include, but are not limited to, polymers such as polyurethane, rubber, silicone or that sold under trademarks Lycra® by Invista or Estane® by Lubrizol. The film or sheet 116 can have a thickness of 0.10 to at least 50 mm, although films or sheets having a thickness from 0.5 mm to 25 mm are preferred. The through holes formed in the film or sheet may have a suitably sized circular or non-circular shape. The non-circular shapes may include, but are not limited to, square, rectangular, triangular, elliptical, trapezoidal, hexagonal and other polygonal shapes. Holes can be formed in the film or sheet when it is extruded, or they can be mechanically punched or thermally formed after the structure is co-extruded. The openings of the holes in each surface of the film can have the same or different cross-sectional areas.

Figure 7:
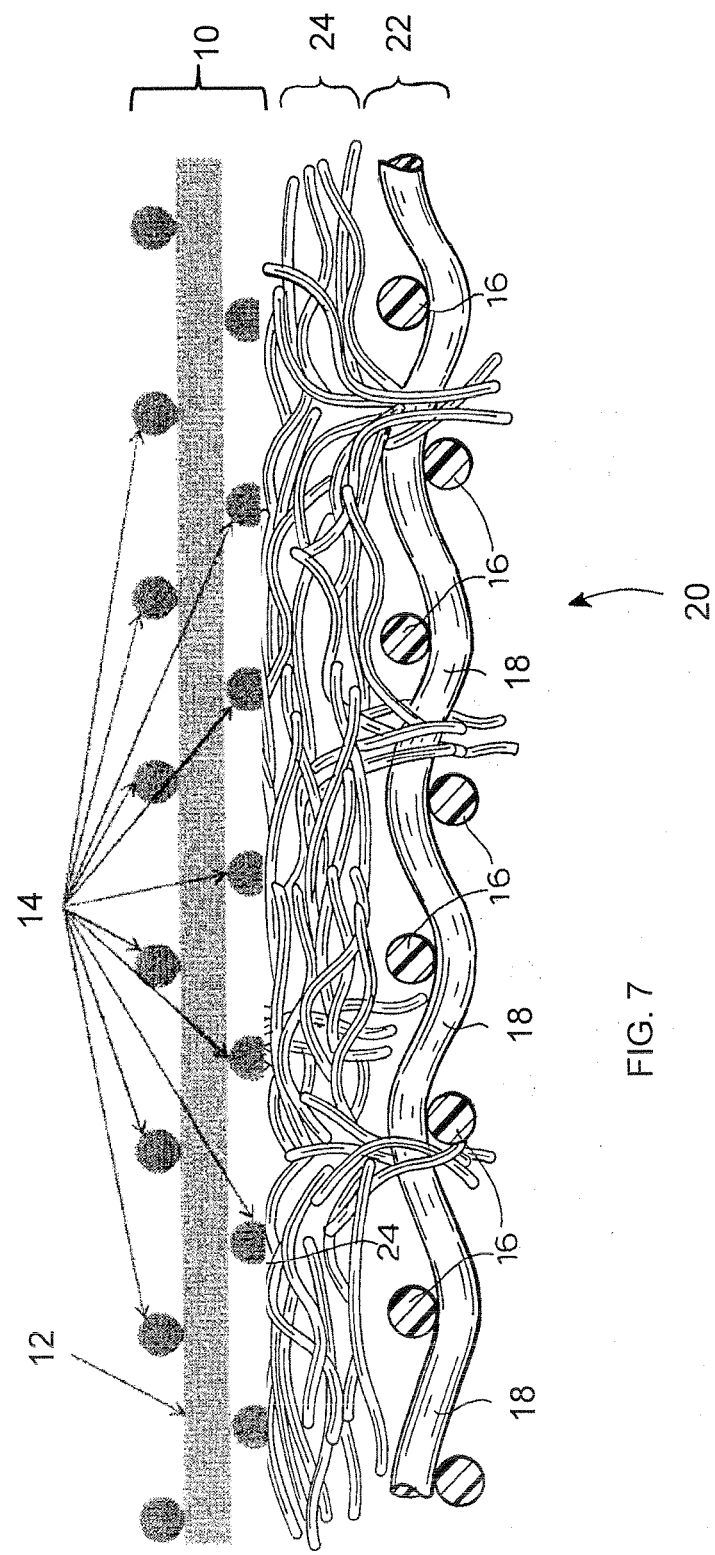
FIG. 7 is a schematic cross-sectional view of a bicomponent extruded mesh, according to one embodiment of the present invention.

According to one embodiment of the present invention, structure 20 can include one or more layers of a woven fabric 22 attached to a top and/or bottom surface of the bottom surface of the bicomponent extruded mesh 10. An example is shown in FIG. 7, where layer 22 can be woven from lengthwise yarns 18 and crosswise yarns 16. The yarns 16, 18 may be any conventional textile yarns such as monofilament, multifilament, or spun yarns of natural or synthetic textile fibers. Representative of such yarns are monofilaments made from polyamides and polyesters. Fabric 22 may be woven using any conventional weave, simple or complex, single or multilayered, as conventionally known.

According to one embodiment, the extruded mesh can be structurally integrated with one or more layers of a nonwoven material 24 of textile fibers attached to the top and/or bottom surface of the woven layer 22 and/or the co-extruded structure itself by for example, needling (needle punching), or use of adhesives or thermal fusion. The nonwoven material 24 attached to the bicomponent extruded mesh may be made up of any conventional textile fibers. Representative of such textile fibers are staple fibers of polyesters, polyamides and the like.

According to another embodiment, one or more layers of nonwoven, textile fibers such as batt or spunbonded webs can be adhered to the outer surface of the bicomponent extruded mesh 10 itself, for example. The adherence of an additional layer(s) to the bicomponent extruded mesh 10 can also be by needling, adhesion, or thermal fusion. For simplicity, the embodiment described has only two nonwoven fibrous layers. However, those skilled in the art will appreciate that any number of nonwoven fibrous layers such as layer 24 may be built up to obtain a desired structure of a particular thickness, density and void volume.

The bicomponent extruded mesh can be processed, if necessary, to produce a smooth surface, and can be coated with foams, or impregnated with resins or foams that are also compressible and resilient in nature. Other forms including one or more layers of a membrane, or yarn arrays can be laminated to the bicomponent extruded mesh. The structure which includes the compressible, resilient bicomponent extruded mesh must be constructed to have a sufficient degree of compressibility as well as have sufficient elasticity as well as strength to allow the structure to rebound, or 'spring back,' as required upon exposure to, and removal of, an applied load normal to the structures surfaces for the end use. For example, for use as a component of the support pad in the bottom of a shoe, stepping would cause the pad to compress at a desired rate and to a desired degree, giving some support and cushion to the foot, and lifting the foot would cause the pad to "rebound" to its original thickness. The compression and rebounding of the structure has at least the following benefits:

1.) Improved recovery characteristics over memory foams, gels, spring systems, etc;
2.) Smooth and uniform surface characteristics to allow, for example, improved support of the shoe and the foot;
3.) Excellent retention of the recovery/dampening characteristics due to the mesh structure's 'full' recovery;
4.) Excellent compression recovery vs. weight ratio, allowing significant dampening capability with a light weight structure;
5.) Excellent 'breathability' of the shock absorbing structure, allowing perspiration and other moisture to evaporate and/or be removed at each compression.

For any of the embodiments of the bicomponent mesh or netting, while two layers of inelastic strands are taught, only one layer of inelastic (LD) tensile strands may be necessary for the structure to function in use, and the other layer on the other surface can also be elastic.

Furthermore, for any of the embodiments taught of the bicomponent (may be different elastomers or the same) mesh netting, all three layers may be elastic as long as the mesh is laminated to a LD load (tensile) bearing structure, such as a woven fabric made from inelastic polyester or polyamide. According to one embodiment, the bicomponent mesh or netting in any of the previous embodiments can be turned 90° so that the relatively inelastic functional LD strands are now in the TD and the elastic TD strands or elastic material are in the LD as long as the mesh or netting is laminated to a LD load (tensile) bearing structure, such as a woven fabric made from inelastic polyester or polyamide.

Modifications to the present invention would be obvious to those of ordinary skill in the art in view of this disclosure, but would not bring the invention so modified beyond the scope of the appended claims.

The invention claimed is:

1. A bicomponent mesh having layers of parallel strands formed by extrusion, comprising:
   a first layer of the parallel strands running in a longitudinal direction;
   a second layer of the parallel strands on one side of the first layer, the second layer's strands running in a second direction and comprising elastomeric strands; and
   a third layer of the parallel strands on the opposite side of the second layer as the first layer and running in the same direction as those of the first layer,
   wherein the first, second, and third layers are co-extruded at substantially the same time such that the strands in the first layer are positioned or aligned within the space between strands in the third layer,
   wherein the first, second, and third layers form a structure having a desired thickness,
   wherein under a compressive load the second layer stretches to enable the strands of the first and third layers to nest between each other in substantially the same plane, and
   wherein upon release of the compressive load elasticity of the second layer causes the first and third layers to spring back returning the structure to substantially the desired thickness.

2. The bicomponent mesh of claim 1, wherein strands in the first, second, and third layers are extruded polymeric elongate members which cross and intersect during extrusion to form a net-like structure.

3. The bicomponent mesh of claim 1, wherein the number of strands in the third layer is less than the number of strands in the first layer or vice versa.

4. The bicomponent mesh of claim 1, wherein the strands of the second layer are orthogonal to those of the first and third layer.

5. The bicomponent mesh of claim 1, further comprising:
   a fourth layer of parallel strands in the same direction as the second layer, and comprising elastomeric strands; and
   a fifth layer of parallel strands in the same direction as the first layer, wherein the strands of the fifth layer are aligned in the same vertical plane in a through thickness direction as that of the first or third layer.

6. The bicomponent mesh as claimed in claim 1, wherein the elastomeric strands include an elastomeric material selected from the group consisting of: styrenic block copolymer, elastomeric co polyesters, elastomeric copolyamides, elastomeric polyolefins, thermoplastic polyurethanes, and copolymers thereof.

7. The bicomponent mesh as claimed in claim 5, wherein the strands in the first, third, and fifth layers are selected from the group consisting of: polypropylene, polyethylene, polybutene, polyesters, polyamides, polyurethanes, and copolymers thereof.

8. The bicomponent mesh as claimed in claim 1, wherein the strands have a cross-section selected from the group consisting of: round, or non-round, including square, rectangular, elliptical or oval, triangular, star shaped, grooved and a polygonal shape.

9. The bicomponent mesh of claim 1, wherein the bicomponent mesh is used in a athletic shoes, regular shoes, boots, floor carpet, carpet pad, or sports floor, automobile parts, composites, flooring; subfloors, press pads, ballistic cloth, sporting equipment padding, knee/elbow pads for runners, racers, skaters, volleyball players, cricket shin/knee pads, football hip pads, wall padding in stadiums, gymnasiums, arenas, shoe inserts, heels/soles for athletic shoes; cushioning layer for bedding, vehicle seats, or pillows.

10. The bicomponent mesh of claim 1, wherein the first and/or third layers comprise a material more inelastic than the material of the second layer.

11. The bicomponent mesh of claim 1, wherein the first and/or third layers comprise an elastic material.

12. The bicomponent mesh as claimed in claim 8, wherein the diameters of round strands is in the range of 0.1 mm to 150 mm.

13. The bicomponent mesh of claim 10, wherein the bicomponent mesh is turned 90° so that the more inelastic material is in the second direction and the elastic strands or elastic material is in the longitudinal direction.

14. The bicomponent mesh of claim 11, wherein the extruded mesh is laminated to a machine direction load bearing structure including a woven fabric made from inelastic polyester or polyamide.

15. The bicomponent mesh of claim 13, wherein the extruded mesh is laminated to a machine direction load bearing structure including a woven fabric made from inelastic polyester or polyamide.

16. The bicomponent mesh of claim 1, wherein material for the strands of the first, second, and third layers are selected such that the layers are bonded together as a result of the extrusion.

17. A bicomponent mesh having layers of parallel strands formed by extrusion, comprising:
   a first layer of the parallel strands running in a longitudinal direction;
   a second layer of an elastic material on one side of the first layer; and
   a third layer of the parallel strands on the opposite of the second layer as the first layer and running in the same direction as those of the first layer,
   wherein the first, second, and third layers are co-extruded together such that the strands in the first layer are positioned or aligned within the space between strands in the third layer,
   wherein the first, second, and third layers form a structure having a desired thickness,
   wherein under a compressive load the second layer stretches to enable the strands of the first and third layers to nest between each other in substantially the same plane, and wherein upon release of the compressive load elasticity of the second layer causes the first and third layers to spring back returning the structure to substantially the desired thickness.

18. The bicomponent mesh of claim 17, wherein the elastic material is an elastic extruded film or sheet that is defined as elastic, resilient, and compressible in its thickness direction and extensible, bendable, and resilient in its length direction.

19. The bicomponent mesh of claim 18, wherein the elastic nonwoven extruded film or sheet comprises a plurality of through holes or voids distributed in a predetermined pattern.

20. The bicomponent mesh of claim 19, wherein the holes or voids have the same or different sizes.

21. The bicomponent mesh of claim 18, wherein the elastic nonwoven extruded film or sheet is composed of polyurethane, rubber, or silicone.

22. The bicomponent mesh of claim 19, wherein the plurality of through holes or voids have a circular, or non-circular shape selected from square, rectangular, triangular, elliptical, trapezoidal, hexagonal and a polygonal shape.

23. The bicomponent mesh of claim 19, wherein the plurality of through holes or voids are formed in the co-extruded mesh when it is extruded, or they are mechanically punched or thermally formed after the mesh is co-extruded.

24. The bicomponent mesh of claim 17, wherein the film or sheet has a thickness of 0.10 to at least 50 mm.

25. The bicomponent mesh as claimed in claim 17, wherein the strands have a cross-section selected from the group consisting of: round, or non-round, including square, rectangular, elliptical or oval, triangular, star shaped, grooved and a polygonal shape.

26. The bicomponent mesh of claim 17, wherein the first and/or third layers comprise a material more inelastic than the material of the second layer.

27. The bicomponent mesh of claim 17, wherein material for the strands of the first, second, and third layers are selected such that the layers are bonded together as a result of the extrusion.

28. The bicomponent mesh of claim 17, wherein the first and/or third layers comprise an material.

* * * * *